United States Patent [19]
Sedelmayer

[11] 3,954,198
[45] May 4, 1976

[54] LIFT TRUCK FOR VEHICLES

[76] Inventor: Franz X. Sedelmayer, Gaissacher Str. 5, 8 Munich 70, Germany

[22] Filed: Sept. 20, 1974

[21] Appl. No.: 507,770

[30] Foreign Application Priority Data
Oct. 3, 1973    Germany............................ 2349717

[52] U.S. Cl............................... 214/333; 254/93 R; 280/638
[51] Int. Cl.² ......................................... B60B 29/00
[58] Field of Search ........... 214/330, 331, 333, 390, 214/392, DIG. 4; 254/93 R; 280/34 A

[56] References Cited
UNITED STATES PATENTS

| | | | |
|---|---|---|---|
| 2,812,086 | 11/1957 | Kuenzi................................ | 214/333 |
| 2,996,206 | 8/1961 | McKee................................ | 280/34 A |
| 3,160,393 | 12/1964 | Councilman....................... | 254/93 R |
| 3,583,723 | 6/1971 | Nowell et al..................... | 214/333 X |

*Primary Examiner*—Robert G. Sheridan
*Attorney, Agent, or Firm*—Lerner, David, Littenberg & Samuel

[57] ABSTRACT

A lift truck for vehicles comprising a telescopic support. Two wheel-carrying axles extend from one and the same side of the support. Two lifting arms extend from said one side of the support between and parallel to the axles. When the support is contracted the lifting arms engage opposite sides of a vehicle wheel situated between them. Continued contraction of the telescopic support extends an upward component of force on the vehicle wheel and lifts it clear of the ground.

9 Claims, 7 Drawing Figures

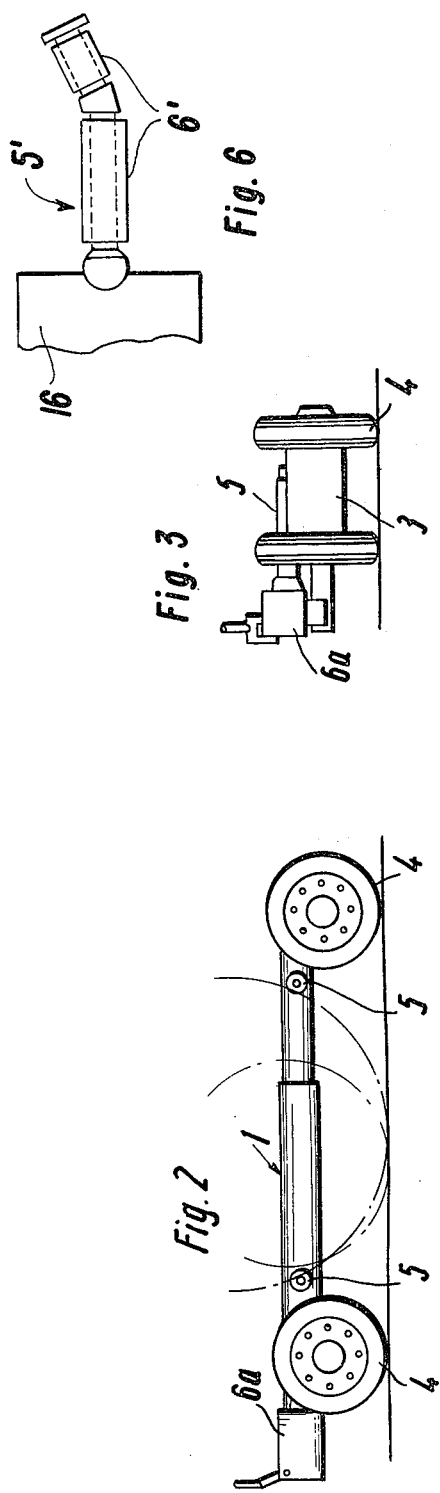
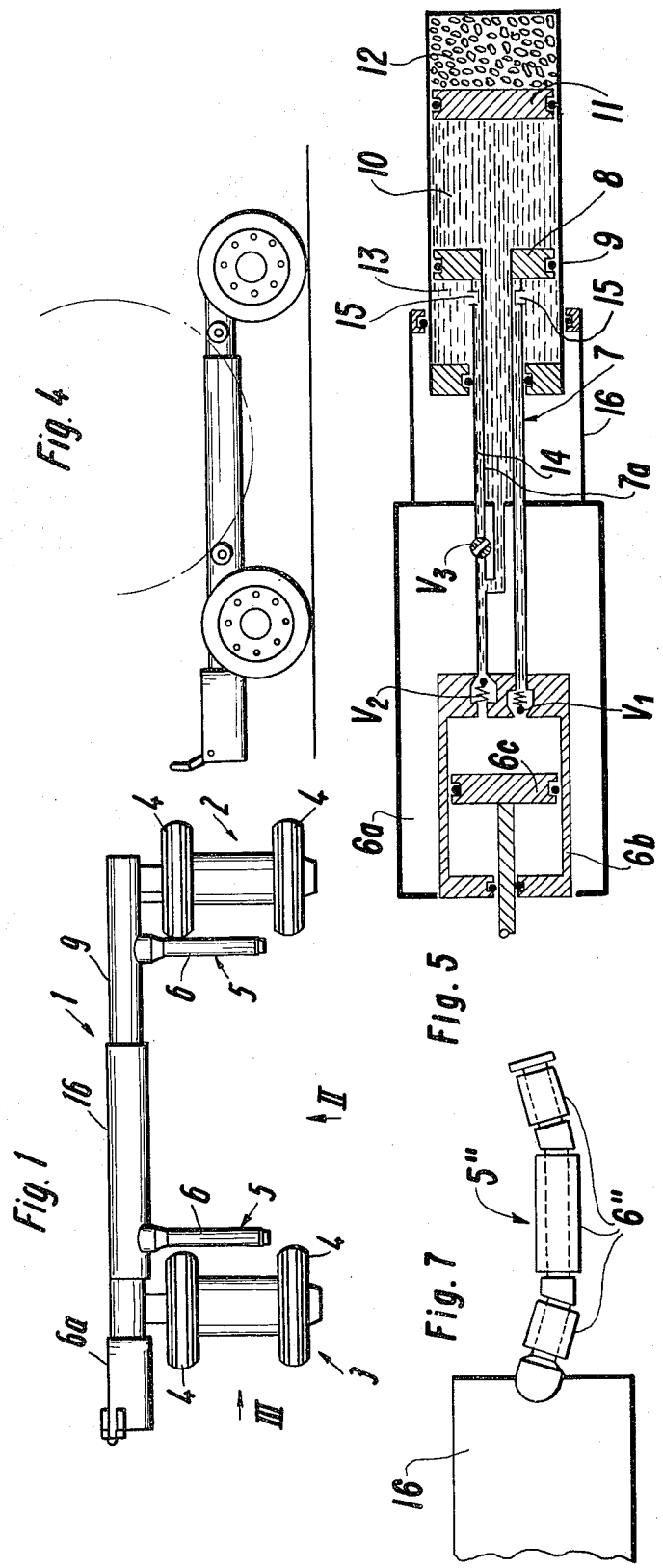

LIFT TRUCK FOR VEHICLES

FIELD OF THE INVENTION

The invention relates to a lift truck for vehicles, particularly motor vehicles. Such lift trucks are frequently used for manoeuvring vehicles in confined spaces or even for towing vehicles when, for example, direct towing is impossible if the wheels are jammed.

It is an object of the invention to provide a lift truck which is simple to attach and easy to handle.

STATEMENT OF THE INVENTION

The invention provides a lift truck for vehicles comprising a telescopic support, two spaced axles projecting from one side of the support and two lifting arms projecting from the said one side of said support between and substantially parallel to the said axles, whereby the lifting arms can be urged against the tread or running surface of the vehicle wheel by retracting the telescopic support below the vehicle wheel axle. If the telescopic support is then retracted further a vertical component of force is exerted on the vehicle wheel which is moved upwardly, the two lifting arms sliding along the tread. The positioning of the lifting arms below the vehicle wheel axle produces a vertical component of force during contraction which lifts the wheel. The arrangement is the special advantage that the entire suspension of a vehicle does not have to be raised to lift the vehicle clear of the ground. Indeed it is sufficient for the actual vehicle wheel to be lifted only centimeters clear of the ground so that the required overall lifting height is extremely small. Designing the lift truck as a device for lifting a wheel has the added advantage that the truck is extremely easy to handle and facilitates manoeuvrability.

To prevent the lifting arms from slipping off the raised vehicle wheel, their free ends are advantageously bent so as to partially enclose the wheel, which is advantageous particularly when cornering.

To provide the lifting truck with maximum stability each of the wheel axles of the truck can carry a pair of wheels, said wheels preferably being pivotable to permit manoeuvrability in extremely confined spaces.

A particularly simple embodiment is obtained if the telescopic support is formed by a piston/cylinder unit comprising a cylinder which admits working fluid to either side of the power piston, the said fluid on the front side of the power piston being subjected to the pressure of a pneumatic pad by a free piston and, to shorten the unit, capable of being pumped to the rear side of the power piston having a smaller cross-section. This involves a simple operating hydraulic system which is reset in the balanced starting position by the pneumatic pad operating in combination with the weight of the lifted load to be deposited again, the pneumatic pad or cushion being further compressed by the smaller cross-sectional area on the rear side of the power piston despite the working fluid being drawn from the front side of the piston since the power stroke is greater than the equivalent cross-sectional height on the front side of the piston.

BRIEF DESCRIPTION OF THE DRAWINGS

FIG. 1 shows a plan view of a lift truck according to the invention;

FIG. 2 shows the lift truck when about to lift a vehicle wheel, the vehicle wheel being shown in chain lines, the truck being seen when looking in the direction of arrow II in FIG. 1;

FIG. 3 shows the lift truck, looking in the direction of arrow III in FIG. 1;

FIG. 4 shows a view of the lift truck similar to that in FIG. 2, after a vehicle wheel has been raised; and FIG. 5 shows a diagrammatic sectional view of the hydraulic system for operating the lift truck.

FIGS. 6 and 7 illustrate in detail alternative embodiments for the lifting arms of the present invention.

DESCRIPTION OF A PREFERRED EMBODIMENT

The lift truck consists of a horizontal telescopic support 1, each end of which carries an axle 2 or 3 each having a pair of wheels 4 lying parallel to one another. The two axles 2 and 3 project from one side of the telescopic support 1 and support the latter parallel to the ground. The height of the wheels 4 is such that the longitudinal axis of the telescopic support always lies below the rotational axis of a vehicle wheel to be raised. In addition, the axles 2 and 3 are longitudinally spaced so that all sizes of vehicle wheels may be received between the axles 2 and 3. If the left hand axle, (as seen in FIG. 1), is regarded as the "dead" or stationary axle, the right hand axle 2 can be moved towards and away from the other with the aid of the telescopic support.

Each axle is associated with a lifting arm 5, which arms extend horizontally from the telescopic support 1 between and in the same direction as the two axles 2 and 3. Each lifting arm has a plastics roller 6 and the arrangement is such that the two lifting arms may be located on opposite sides of a vehicle wheel which is to be lifted, as shown in FIG. 2 in which vehicle wheels of different sizes are indicated by chain-dotted lines. After the lift truck is positioned adjacent a vehicle wheel to be lifted the telescopic support 1 is retracted, i.e. the lifting arms are moved towards one another until they come into contact with the tread of the tire of the wheel to be fitted. When the lifting arms are moved closer together an upwardly directed component of force is exerted on the vehicle wheel so that the wheel is raised and supported by the lifting arms in the manner shown in FIG. 4. If a lift truck is used to lift each pair of wheels on each wheel axle in this way a vehicle may be transported. Only a small clearance between the vehicle wheel and the ground is necessary to enable the vehicle to be transported and since the wheels are supported from beneath it is only necessary to lift the vehicle a small distance to achieve the necessary clearance. If the vehicle were lifted by the chassis it would be raised by a distance equivalent to the entire movement of the suspension to obtain ground clearance for the wheels.

To facilitate manoeuvrability the axles 2 and 3 can be pivotable about vertical axes. In addition, the free ends of the lifting arms can be bent or generally curved to form a trough shape so as to support the vehicle wheel.

The telescopic support 1 is actuated with the aid of a hydraulic system with pressure applied from one side, the system being connected to a hand pump 6a at one end of the telescopic support. The telescopic support forms a piston/cylinder unit consisting of a fixed power piston 8 connected to the pump 6a by a hollow piston rod 7, a cylinder 9 which is slidable relative to the piston 8 and which defines a chamber 10 for storing the working fluid at the leading end of the power piston, and a pneumatic pad or cushion 12 separated from the chamber 10 by a free piston 11. On the trailing side of the power piston 8 of the cylinder 9, together with the piston rod 7, forms an annular chamber 13, the cross-section of which is smaller than that of the storage chamber 10 and which can be filled with working fluid by the hollow piston rod 7, which fluid, upon retracting the piston 6c of pump 6a to the left of cylinder 6b, can be drawn through power piston 8 and hollow piston rod 7 via valve V2. When the piston 6c is reversed, the fluid is pumped into annular chamber 13 via valve V1, delivery pipe 14 and openings 15. Delivery pipe 14 and the interior of piston rod 7 can be connected with one another for direct flow by a separate control valve V3 so that a pressure balance can be achieved between annular chamber 13 and storage chamber 10. In addition to being guided along the power piston 8 and the piston rod 7, the cylinder 9 can also be guided in a guide cylinder 16 which is connected to the housing of the pump 6a and supports one lifting arm 5 while the other lifting arm is located on the cylinder 9. If in this embodiment the pump draws working fluid from the storage chamber 10 and pumps it into the annular chamber 13, the power stroke of the cylinder is greater than it would be if the storage chamber was shortened by an amount corresponding to the quantity of fluid drawn from the storage chamber, since the working area of the annular chamber 13 is smaller than that of the storage chamber, i.e. the amount of fluid drawn from the latter needs to be accommodated in a longer space. This means that as a result of the working fluid being drawn from the storage chamber 10 the pneumatic pad is not relieved of pressure, but is subjected to increasing preliminary tension so that upon subsequent pressure relief the automatic return stroke to the starting position is ensured due to the pressure of the pretensioned pneumatic pad. A simple operating hydraulic system having a power stroke operating in both directions is obtained in this manner. Only a flow connection between the annular chamber 13 and the storage chamber 10 needs to be produced for the return to the starting position. This is effected advantageously in such a manner that the delivery pipe 14 is connected to the interior of the hollow piston rod 7. To achieve optimum evacuation of the annular chamber 13 the connecting holes between the annular chamber 13 and the interior of the hollow piston rod are located on the piston side of the piston rod.

In its application this described hydraulic system is not limited to lift trucks of the described type, but can be used in numerous other technical fields. where a power stroke needs to be effected with the aid of a hydraulic drive and where the return movement has to be made without the hydraulic drive.

Various modifications may be made to the embodiments described without departing from the spirit and scope of the invention.

What we claim is:

1. A lift truck for vehicles, comprising a telescopic support, two spaced axles projecting from one side of said support and two lifting arms projecting from said one side of said support between and substantially parallel to said axles, said telescopic support including a piston/cylinder unit including a power piston and a first cylinder movable relative to each other, and a second cylinder, said first and second cylinders being movable relative to each other, said first cylinder and said second cylinder each supporting one of said axles and one of said lifting arms, whereby said lifting arms can be urged aginst a vehicle wheel by retracting the telescopic support below the vehicle wheel axle.

2. The lift truck of claim 1, wherein the lifting arms carry rotatable plastics rollers which are adopted to contact the tread of the vehicle wheel.

3. The lift truck of claim 1, wherein the lifting arms are bent at their free ends so as to partially enclose the vehicle wheel.

4. The lift truck of claim 1, wherein said axles each support a pair of wheels.

5. The lift truck of claim 4, wherein pair of wheels are pivotable about axes at right angles to said support.

6. The lift truck of claim 1, wherein said telescopic support includes means for admitting working fluid to either side of said power piston from said first cylinder, a free piston in said first cylinder, pneumatic pad means defined between the end of said first cylinder and said free piston, the leading end of said power piston being subjected to the pressure of said pneumatic pad means, said power piston having a trailing side which has a smaller cross-sectional area than the leading side thereof, said support being contracted by pumping fluid to said trailing side of said power piston.

7. The lift truck of claim 6 including a pump, and wherein said power piston is connected to said pump by a hollow piston rod and a delivery pipe, whereby working fluid can be pumped via said delivery pipe through said power piston and said hollow piston rod to said pump and through the hollow interior of said piston rod to the trailing side of said power piston, as a result of which a direct flow connection can be produced between said delivery pipe and the interior of said piston rod.

8. The lift truck of claim 7, wherein the pump is a hand pump.

9. A lift truck for vehicles comprising a telescopic support, two spaced parallel axles extending from one and the same side of said telescopic support, said axles carrying wheels, two lifting arms extending from said one side of said telescopic support, said lifting arms being spaced apart and parallel to said axles, said telescopic support including a piston/cylinder unit including a power piston and a cylinder movable relative to each other, said piston and said cylinder each supporting one of said axles and one of said lifting arms, means for extending or contracting the telescopic support, whereby when the telescopic support is contracted, the lifting arms can be brought into engagement with opposite sides of the wheel of the vehicle to be lifted and whereby continued contraction of said telescopic support exerts an upward component of force on said vehicle wheel so as to lift the wheel.

* * * * *